United States Patent [19]

Fluegel

[11] Patent Number: 4,888,493
[45] Date of Patent: Dec. 19, 1989

[54] SPEED TRIMMING INTEGRATED DRIVE GENERATOR

[75] Inventor: Theodore D. Fluegel, Waltham, Mass.

[73] Assignee: Sundstrand Corporation, Rockford, Ill.

[21] Appl. No.: 235,609

[22] Filed: Aug. 24, 1988

[51] Int. Cl.⁴ .............................................. H02P 9/42
[52] U.S. Cl. .................................... 290/4 C; 290/4 R; 322/40
[58] Field of Search ...................... 290/4 R, 4 A, 4 C; 318/13; 322/17, 22, 35, 38, 40

[56] References Cited

U.S. PATENT DOCUMENTS

| | | | |
|---|---|---|---|
| 2,759,110 | 8/1956 | Alexander | 307/84 |
| 2,892,098 | 10/1957 | Bergvall | 307/84 |
| 3,056,914 | 10/1962 | Potter | 322/40 |
| 4,246,531 | 1/1981 | Jordan | 322/28 |
| 4,330,743 | 5/1982 | Glennon | 322/10 |
| 4,488,053 | 12/1984 | Cronin | 290/4 C |
| 4,554,501 | 11/1985 | Baker | 322/29 |
| 4,572,961 | 2/1986 | Borger | 290/4 R |
| 4,580,402 | 4/1986 | Firey | 290/4 C X |
| 4,587,436 | 5/1986 | Cronin | 307/21 |
| 4,636,707 | 1/1987 | Law | 322/35 |
| 4,661,762 | 4/1987 | Baker | 322/40 |
| 4,694,187 | 9/1987 | Baker | 290/4 R |

Primary Examiner—William M. Shoop, Jr.
Assistant Examiner—W. E. Duncanson, Jr.
Attorney, Agent, or Firm—Wood, Dalton, Phillips Mason & Rowe

[57] ABSTRACT

A speed trimming integrated drive generator 18 includes a differential 24 having inputs coupled to a prime mover 20 and to a wild frequency generator 48, the output thereof being coupled to a main generator 14. In order to control main generator speed, and thus the frequency of the power generated by the main generator 14, resistive load management for the wild frequency generator 48 is utilized. Particularly, a generator control unit 58, responsive to the main generator frequency, selectively couples resistive loads 56 to an output 52 of the wild frequency generator 48 to provide trimming power. Fine tuning of the trimming power is provided by controlling the output voltage from the wild frequency generator 48 responsive to sensed frequency.

16 Claims, 3 Drawing Sheets

SPEED TRIMMING INTEGRATED DRIVE GENERATOR

FIELD OF THE INVENTION

This invention relates generally to a power generator and more particularly to an integrated drive generator including a load controlled wild frequency generator for speed trimming.

BACKGROUND OF THE INVENTION

Known integrated drive generators utilize a differential coupled between a prime mover and a main generator. A hydraulic pump-motor assembly known as a "hydraulic log" and including two positive displacement machines alternatively usable as pumps or motors is coupled between the prime mover and a compensation shaft of the differential to accomplish speed trimming to drive the main generator at constant speed. Such integrated drive generators have high reliability and work well for their intended purpose. However, the high cost of the hydraulic log is undesirable.

An alternative electro-mechanical arrangement for providing a constant speed drive generating system is disclosed in Baker, U.S. Pat. No. 4,694,187. This generating system utilizes a mechanical differential also coupled between the prime mover and the main generator. A power converter having a rectifier and inverter is electrically connected between the main generator output lines and a variable speed generator coupled to the compensation shaft of the differential. The system controls the converter having a rectifier and inverter to control trimming power. Such a control requires complex electrical controls to provide proper trimming power which can be expensive. Also, it is necessary to provide proper matching between rectifier and inverter circuitry and controls therefor.

The present invention is directed to overcoming one or more of the problems as set forth above.

SUMMARY OF THE INVENTION

It is an object of the invention to provide a speed trimming integrated drive generator utilizing load control switching to control trimming power. By utilizing load control switching, a complex hydraulic or electrical system is not required, resulting in savings in cost.

Specifically, a compensated constant speed drive according to the invention develops constant speed motive power from variable speed motive power developed by an output shaft of a prime mover. A speed summer has an input shaft connectable to the prime mover, a compensation shaft for receiving a control signal or input for speed compensation purposes, and an output shaft at which the constant speed motive power is developed. A dynamoelectric machine including a motive power shaft is coupled to the speed summer compensation shaft to provide trimming and includes electrical power windings. Means are provided for generating a signal representing the speed of the speed summer output shaft. A control responsive to the speed of the speed summer output shaft selectively couples the trimming electrical power windings to a plurality of resistive loads so that the dynamoelectric machine develops compensating speed of a magnitude sufficient to maintain the speed summer output shaft at the desired speed.

According to a preferred embodiment of the invention, the output shaft of the speed summer drives a main generator which develops power for operating selected loads. In an aircraft application, many such loads require precise frequency control. Controlling the speed of the main generator shaft results in controlled frequency of the output power.

In a first embodiment of the invention, the dynamoelectric machine is a wound rotor wild frequency generator. A generator control unit, responsive to frequency of the main generator output power, controls switching of resistive loads to the wild frequency generator to control the compensation speed to approximate necessary trimming power. For fine tuning of the trimming power, the generator control unit is also operable to control the wild frequency generator exciter current.

In a second embodiment of the invention, the wild frequency generator comprises a permanent magnet generator. The generator control unit is operable to provide load switching and to control a converter regulator for fine tuning of the trimming power.

In addition to providing speed trimming, the wild frequency generator is utilized to power resistive loads which do not require regulated power at precise frequencies. For example, in an aircraft, such loads might include a cabin heating device or deicing equipment.

These and other features of the present invention will be more readily apparent with reference to the drawings and specifications.

DESCRIPTION OF THE PREFERRED EMBODIMENTS

Figure 1:
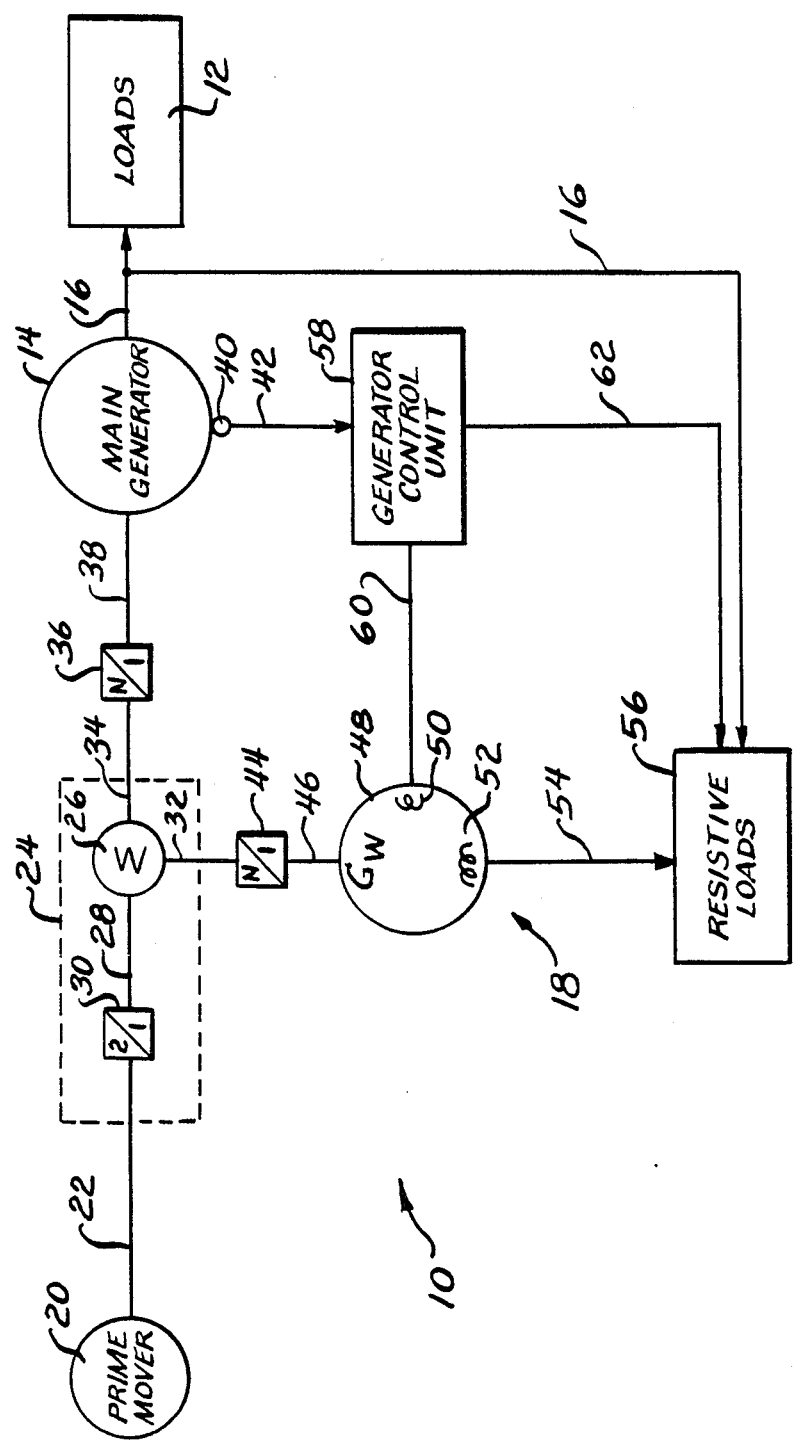
FIG. 1 is a block diagram of the integrated drive generator according to a first embodiment of the present invention.

With reference to FIG. 1, an aircraft, not shown, typically includes an electrical power generating system 10 for powering aircraft loads 12. Certain loads, such as aircraft navigation controls, are sensitive to the frequency of power which is supplied thereto. Accordingly, it is necessary to provide a main generator 14 which operates at a constant speed to provide constant frequency power over power lines 16 to the loads 12. An integrated drive generator system 18 according to a first embodiment of the present invention is operable to provide constant speed motive power to the main generator 14.

A prime mover 20, typically an aircraft engine, develops variable speed motive power at an output shaft 22. A mechanical differential 24 of conventional construction comprises a speed summer 26 having an input shaft 28 coupled through a speed reducer 30, having a 2:1 speed ratio, to the prime mover 22. The speed summer 26 also includes a compensation shaft 32 and an output shaft 34 which is coupled through a speed reducer 36 to an input shaft 38 of the main generator 14. The speed of the input shaft 28 is equal to the sum of the speeds of the compensation shaft 32 and the output shaft 34. Therefore, loading the compensation shaft 32 results in a decrease in speed thereof, causing the speed of the output shaft 34 to increase. Conversely, if loading is reduced on the compensation shaft 32 thereby increasing the speed thereof, then the speed summer 26 is operable to decrease the speed of the output shaft 34.

In the illustrative embodiment, the main generator 14 develops 400 Hz power, although generators of other frequency could be utilized as necessary. A conventional frequency sensor 40 senses the frequency of power developed by the main generator 14, and a signal representative thereof is carried on a line 42. The frequency signal on the line 42 also represents the speed of the main generator input shaft 38 due to the relationship between generator speed and output frequency.

The speed summer compensation shaft 32 is coupled through a speed reducer 44 to an input shaft 46 of a dynamoelectric machine, such as a wild frequency generator 48. The wild frequency generator 48 is a wound rotor machine including an exciter winding 50 and an armature winding 52. The power developed in the armature winding 52 is delivered over lines 54 to resistive load block 56, discussed in greater detail below. Similarly, the power developed by the main generator on the line 16 is also coupled to the resistive load block 56.

A generator control unit 58 is coupled to the signal line 42 and receives the frequency signal from the sensor 40. The generator control unit 58 is also coupled over a line 60 to the exciter winding 50, and over a line 62 to the resistive load block 56. The generator control unit 58 is operable, as discussed below, to control excitation of the wild frequency generator 48 and/or to control switching of resistive loads to the wild frequency generator armature winding 52 to provide trimming power to the speed summer 26.

In a speed compensation system, the prime mover can be rotating at the desired output speed, or can be above or below same. When the prime mover speed is above the desired speed, the system is in a condition known as above straight through. Conversely, when the prime mover speed is below the desired speed, the system is in a condition known as below straight through. During the typical flight profile of an aircraft the electrical loading 12 increases as prime mover (jet engine) speed increases. Similarly, in the above straight through condition, trim power increases with prime mover speed. Conversely, electrical loading decreases with increasing trimming requirements in the below straight through condition. Therefore, if the power system 10 can be operated only at above straight through, then the loading and trim power curves tend to match, making control implementation simpler. Therefore, the differential speeds of the mechanical differential 24 and the ratios of the speed reducers 36 and 44 are chosen so that the system operates above straight through for the entire speed range of the prime mover 20.

Since the system operates only in the above straight through condition, the summer 26 must operate in conjunction with the wild frequency generator 48 to "subtract" speed so that speed at the summer output shaft 34 is constant with varying speed at the summer input shaft 28. Therefore, the integrated drive generator system 18 must be operable to provide a suitable braking action on the wild frequency generator 48 so as to control the speed of the generator shaft 46, and thereby the compensation shaft 32, to operate the main generator 14 to develop the desired frequency, i.e. 400 Hz.

A resistive load placed across the output of a generator increases the resistance to rotation of the rotor and thus causes a braking type action whereby the speed of the generator shaft is decreased, all other things remaining equal. Further, the greater the loading, the greater the resistance to rotation. According to the present invention, resistive loads are selectively coupled to the output of the wild frequency generator 48 to provide the braking action to selectively decrease the wild frequency generator speed by an amount dependent on main generator frequency.

Figure 2:
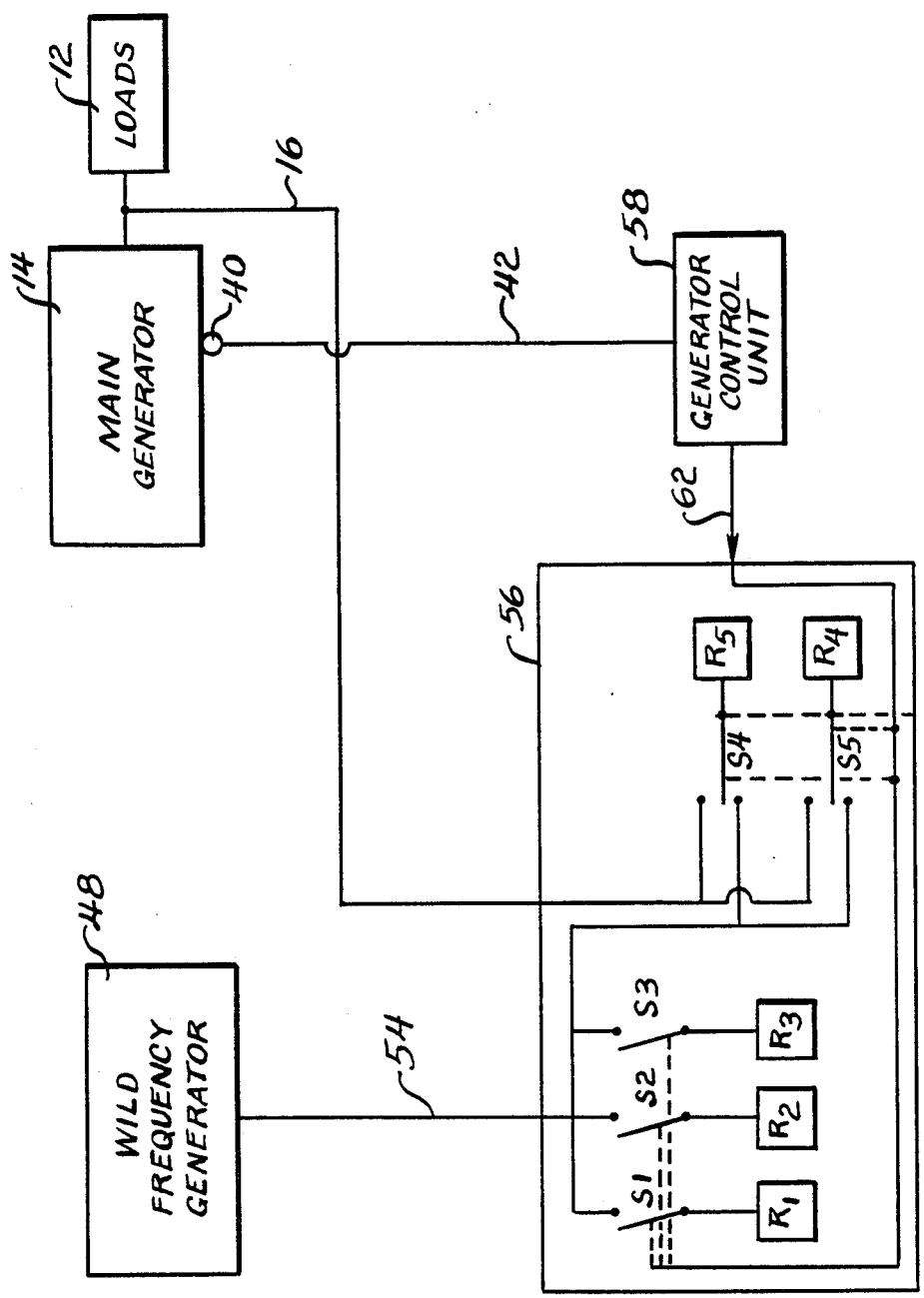
FIG. 2 is a partial block diagram illustrating the load switching for the integrated drive generator of FIG. 1.

With reference also to FIG. 2, the resistive load block 56 includes respective first through fifth resistive loads $R_1$-$R_5$. The first three resistive loads $R_1$-$R_3$ are connected through respective first through third normally open two position switches S1-S3 over the power line 54 to the wild frequency generator armature winding 52. The fourth and fifth resistive loads $R_4$ and $R_5$ are coupled through respective normally open three position switches 54 and 55 to either the main generator power line 16 or the wild frequency generator power line 54. Each of the switches S1-S5 is controlled by the generator control unit 58 over one or more lines 62 responsive to sensed frequency.

The first through third resistive loads $R_1$-$R_3$ comprise resistive loads which are utilized only for trimming. For example, such loads may comprise banks of resistive elements. The fourth and fifth resistive loads $R_4$ and $R_5$, respectively, comprise loads which are normally utilized during aircraft operation. However, such loads do not require precise frequency power, and may be powered by the wild frequency generator. Such loads may include cabin heating devices or deicing equipment. When in use, the switches S4 and S5 for such loads couple them to be powered by the wild frequency generator 48 if necessary to trim the speed of the main generator.

Since the power system 10 is predefined to always run in the above straight through condition, the wild frequency generator frequency is always loaded and acting as a brake on the differential throughout the power supplying speed range. The greater the deviation in frequency from 400 Hz the greater the compensation load deviation required. Therefore, the generator control unit 58 must be operable to provide loading on the wild frequency generator 48 sufficient to compensate for deviation in frequency in order to maintain the main generator frequency at 400 Hz.

Speed and frequency control is accomplished by the generator control unit 58 selectively closing the first through third switches S1-S3, or selectively operating the fourth and fifth switches S4 and S5, to couple their respective resistive loads $R_4$-$R_5$ to the generator armature winding 52. Specifically, the generator control unit 58 provides resistive tive load management as by selectively coupling one or more of the resistive loads $R_1$-$R_5$ to the wild frequency generator 48 so that the wild frequency generator 48 is loaded with an appropriate resistance to adjust wild frequency generator shaft speed sufficiently to compensate for variations in prime mover speed.

The operation of the drive generator system 18 is described with the following example. If the speed of the input shaft 28 is 14,000 RPM, and it is desired that the speed of the output shaft 34 is 12,000 RPM, then it is necessary that the speed of the compensation shaft 32 be 2,000 RPM. A suitable resistive load is obtained by selectively coupling certain of loads R1-R5 to the wild frequency generator 48 to maintain such a speed. If the speed of the main generator 14 subsequently increases to, for example, 12,200 RPM resulting in a decrease in speed to 1,800 RPM at the compensation shaft 32, then it is necessary to increase the speed of the compensation shaft 32 by 200 RPM to 2,000 RPM. The speed increase is accomplished by decreasing the braking action, i.e., decreasing the resistive load as by selectively opening the necessary switches S1–S5 to accomplish such a decrease. A decrease in the load results in the necessary increase in the speed of the compensation shaft 32, causing a corresponding decrease in the output shaft 34 to maintain the desired output speed of 12,000 RPM.

The accuracy of such a system is dependent in part on the number and particular resistance values of the available loads. As such, resistive loading can only provide limited increments of speed compensation. Therefore, the generator control unit is also operable to control generator output voltage by controlling current through the line 60 to the exciter winding 50 to provide fine tuning of the trimming load. Particularly, if the desired frequency cannot be identically reached with resistive load management, then the generator control unit is operable to increase or decrease exciter current and generator output voltage and thus respectively decrease or increase motive speed of the wild frequency generator shaft 46.

Thus, according to the first embodiment of the invention described relative to FIGS. 1 and 2, the integrated drive generator system 18 according to the invention is operable to utilize resistive load management to approximate the necessary trimming load responsive to main generator frequency and to fine tune the trimming load by regulating the output voltage of the wild frequency generator 48.

Figure 3:
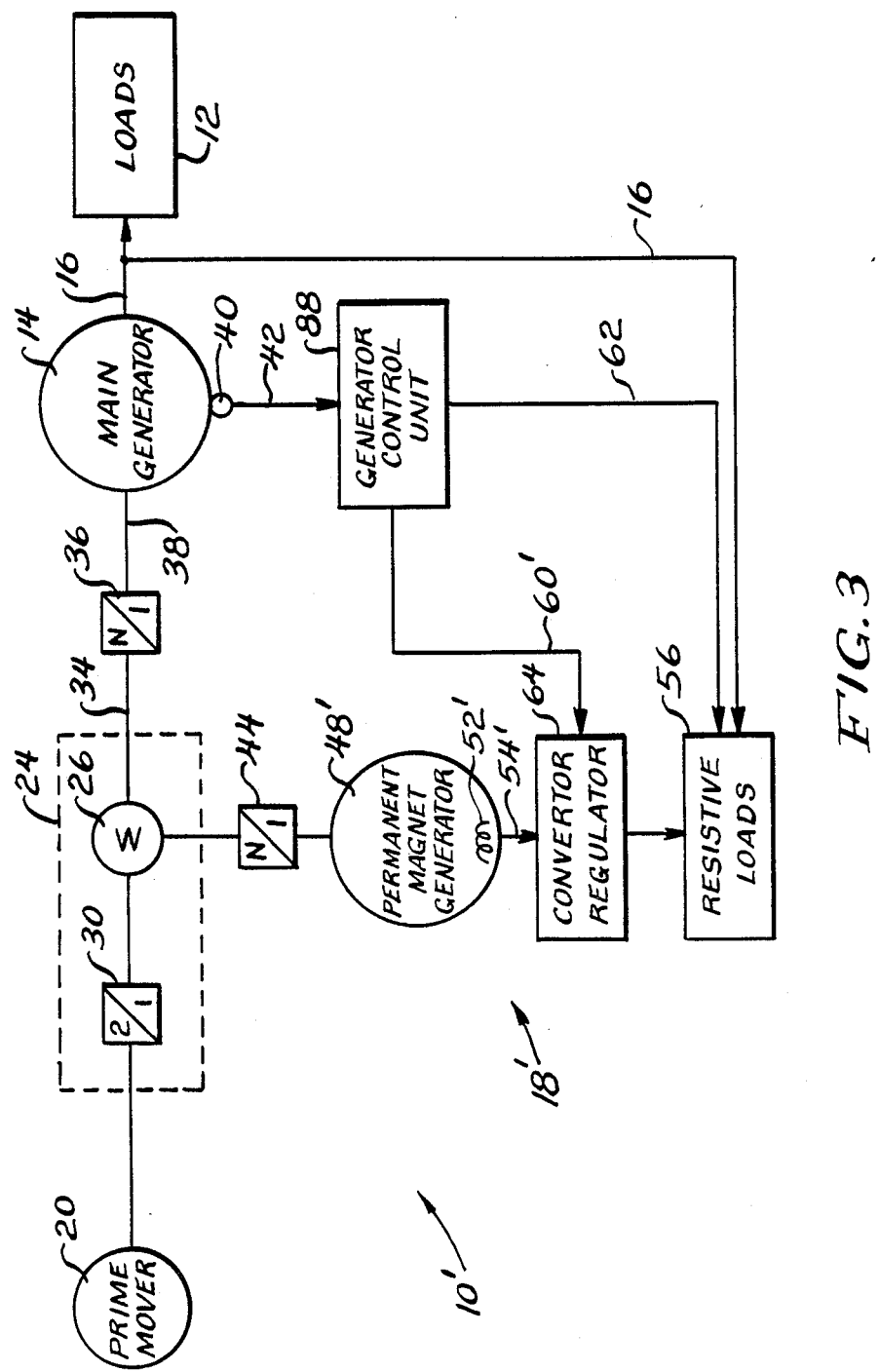
FIG. 3 is a block diagram of an integrated drive generator according to a second embodiment of the invention.

With reference to FIG. 3, an integrated drive generator system 18' according to a second embodiment of the invention is illustrated. The drive generator system 18' is illustrated with like reference numerals indicating components identical to those of the first embodiment previously described relative to FIG. 1.

A wild frequency generator 48' comprises a permanent magnet generator. The permanent magnet generator 48' includes an armature winding 52' coupled to a converter regulator 64 which is in turn coupled to the resistive load block 56. A generator control unit 58', instead of being coupled to the exciter winding 50, as in FIG. 1, is coupled to the converter regulator 64 over a line 60'.

The integrated drive generator system 18' according to the second embodiment operates similarly to that discussed relative to the first embodiment of FIG. 1 in providing resistive load management to approximate trimming power. However, instead of controlling exciter current, the generator control unit 58' controls the converter regulator 64 in a known manner to control output voltage to provide fine tuning of trimming power.

In addition to utilizing the wild frequency generator for speed trimming, as disclosed herein, an inverter may be connected to the output of the wild frequency generator to operate the system as a starter. Particularly, the inverter would operate the wild frequency generator as a motor, which would drive the main generator until it reached synchronous speed. Once the main generator reaches synchronous speed, 400 Hz power is supplied to the generator and it acts as a motor. Thereafter, by applying loads to the wild frequency generator as disclosed herein, the engine would be brought up to speed through the differential.

By utilizing a wild frequency generator 48 in conjunction with resistive load management, a system is provided which operates with increased efficiency. This efficiency is due to the fact that when power demand is high the energy generated by the wild frequency generator is not wasted, but instead can be utilized by normal aircraft components. When the power demand is low, such energy is dissipated through resistive loads provided exclusively for loading the wild frequency generator, as discussed herein. Improved reliability is provided over the use of conventional hydraulic pump and motor trimming applications due to the high reliability available with conventional generators and mechanical differentials.

I claim:

1. A compensated constant speed drive for developing constant speed motive power from variable speed motive power developed at an output shaft of a prime mover, comprising:
  a speed summer having an input shaft, a compensation shaft and an output shaft at which the constant speed motive power is developed, the input shaft being coupled to the prime mover output shaft;
  means for generating a signal representing speed of the speed summer output shaft;
  a dynamoelectric machine including a motive power shaft coupled to the compensation shaft of the speed summer and also including electrical power windings;
  a plurality of resistive loads; and
  means coupled to said generating means and said resistive loads for selectively connecting said resistive loads to said electrical power windings so that the dynamoelectric machine develops compensating speed of a magnitude sufficient to maintain said speed summer output shaft at the desired speed.

2. The drive of claim 1 wherein said dynamoelectric machine comprises a generator having a wound exciter and wherein said electrical power windings comprise a wound armature.

3. The drive of claim 2 further comprising means coupled to said generating means and said exciter for controlling current through said exciter winding to control output voltage to further maintain said speed summer output shaft at the desired speed.

4. The drive of claim 1 wherein said dynamoelectric machine comprises a permanent magnet generator wherein said electrical power winding comprises an armature winding.

5. The drive of claim 4 further comprising means coupled between said generator armature windings and said resistive loads for regulating the output voltage thereof.

6. The drive of claim 5 further comprising means coupled to said regulating means and said generating means for controlling said regulating means to further maintain said speed summer output shaft at the desired speed.

7. A system for operating a main dynamoelectric machine at a constant speed comprising:
  a source of primary motive power having an output shaft;
  a speed summer having an input shaft, a compensation shaft and an output shaft, the input shaft being coupled to the output shaft of said source of primary motive power, and the output shaft being coupled to a shaft of said main dynamoelectric machine;
  means for developing a signal representing speed of said main dynamoelectric machine;

a secondary dynamoelectric machine including a motive power shaft coupled to the compensation shaft and also including electrical power windings which develop output power responsive to rotary movement of said shaft;

means associated with said secondary dynamoelectric machine for regulating output power developed therefrom;

a resistive load connected to said electrical power winding; and means coupled to said developing means and said regulating means for controlling the secondary dynamoelectric machine output voltage in accordance with the speed of said main dynamoelectric machine so that the secondary dynamoelectric machine develops compensating speed of a magnitude sufficient to maintain said main dynamoelectric machine at the desired speed.

8. The system of claim 7, wherein said secondary dynamoelectric machine comprises a generator having a wound exciter and wound armature, wherein the output power is developed by the armature responsive to exciter current.

9. The system of claim 8 further comprising a plurality of resistive loads, and means coupled to said developing means and said resistive loads for selectively connecting said resistive loads to said armature so that the secondary dynamoelectric machine develops compensating speed of a magnitude sufficient to further maintain said main dynamoelectric machine at the desired speed.

10. The system of claim 7 wherein said secondary dynamoelectric machine comprises a permanent magnet generator having an armature winding.

11. The system of claim 10 wherein said regulating means comprise a voltage regulator coupled between said armature and said resistive load.

12. A power generating system for maintaining the output of a main generator at a constant frequency comprising:

a prime mover having a variable speed motive power output shaft;

a speed summer having an input shaft, a compensation shaft and an output shaft, the input shaft being coupled to the prime mover output shaft and the output shaft being coupled to an input shaft for the main generator;

means for generating a signal representing main generator frequency;

a wild frequency generator including a motive power shaft coupled to the compensation shaft and including electrical power windings;

means coupled to said wild frequency generator for controlling voltage developed by said electrical power windings;

a plurality of resistive loads; and means coupled to said generating means, said wild frequency generator and said resistive loads for trimming the speed of said wild frequency generator motive power shaft, said trimming means including means for selectively connecting said resistive loads to said electrical power windings, and means for operating said controlling means to control voltage so that said wild frequency generator develops a motive speed of a magnitude sufficient to maintain said speed summer output shaft, and thus said main generator, at a desired speed to provide the desired constant frequency.

13. The power generating system of claim 12 wherein said controlling means comprises an exciter winding of said wild frequency generator.

14. The power generating system of claim 13 wherein said operating means controls the current through said exciter winding for trimming the speed of said wild frequency generator motive power shaft.

15. The power generating system of claim 12 wherein said wild frequency generator comprises a permanent magnet generator and said controlling means comprises a voltage regulator coupled between said generator electrical power windings and said resistive loads.

16. The power generating system of claim 15 wherein said operating means generates a signal responsive to said main generator frequency and said voltage regulator controls power through said resistive load to trim the speed of said wild frequency generator motive power shaft responsive thereto.

* * * * *